(12) United States Patent
Alameh et al.

(10) Patent No.: US 8,953,853 B2
(45) Date of Patent: Feb. 10, 2015

(54) SENSING CHARACTERISTICS OF ADJACENT FINGERS FOR USER AUTHENTICATION

(71) Applicant: Google Technology Holdings LLC, Mountain View, CA (US)

(72) Inventors: Rachid M. Alameh, Crystal Lake, IL (US); Patrick J. Cauwels, South Beloit, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 87 days.

(21) Appl. No.: 13/834,140

(22) Filed: Mar. 15, 2013

(65) Prior Publication Data

US 2014/0270415 A1 Sep. 18, 2014

(51) Int. Cl.
G06K 9/00 (2006.01)

(52) U.S. Cl.
CPC .................................. *G06K 9/00013* (2013.01)
USPC ......................................................... 382/124

(58) Field of Classification Search
USPC ......................................................... 382/124
See application file for complete search history.

(56) References Cited

U.S. PATENT DOCUMENTS

| | | | |
|---|---|---|---|
| 4,876,725 A * | 10/1989 | Tomko | 382/126 |
| 8,009,147 B2 | 8/2011 | Chang et al. | |
| 8,224,043 B2 * | 7/2012 | Yamada | 382/124 |
| 2002/0126881 A1 * | 9/2002 | Langley | 382/124 |
| 2010/0246902 A1 | 9/2010 | Rowe et al. | |
| 2011/0157346 A1 * | 6/2011 | Zyzdryn et al. | 348/77 |
| 2012/0185698 A1 | 7/2012 | Fiske | |
| 2012/0242635 A1 | 9/2012 | Erhart et al. | |
| 2013/0028488 A1 * | 1/2013 | Abe | 382/115 |

FOREIGN PATENT DOCUMENTS

| | | | |
|---|---|---|---|
| EP | 2551791 A1 | 1/2013 | |
| JP | 2003281508 A | 10/2003 | |
| WO | WO 9809246 A1 * | 3/1998 | G06K 9/00 |
| WO | 2005124659 A1 | 12/2005 | |
| WO | 2011059496 A1 | 5/2011 | |

OTHER PUBLICATIONS

ISR of PCT/US2014/020068 dated Jul. 10, 2014.
Alonso-Fernandez, et al., "Combining Multiple Matchers for Fingerprint Verification: A Case Study in Biosecure Network of Excellence", Annals of Telecommunications, Get Lavoisier, Paris, FR, vol. 62. No. 1/2, Jan. 1, 2007, pp. 62-82.

(Continued)

*Primary Examiner* — John Strege
(74) *Attorney, Agent, or Firm* — Morris & Kamlay LLP

(57) ABSTRACT

To authenticate a user, fingerprint data for multiple fingers of the user fingers is sensed by a fingerprint sensor (504). Each of these multiple fingers is situated adjacent to at least one other of these multiple fingers while the fingerprint data is being sensed by the fingerprint sensor. Various characteristics of the user's fingers can be analyzed (506) as part of the user authentication, such as the length of the user's fingers relative to one another, the width of the user's fingers relative to one another, the locations of minutiae of one of the user's fingerprints relative to the locations of minutiae of other of the user's fingerprints, and so forth.

17 Claims, 12 Drawing Sheets

(56) References Cited

OTHER PUBLICATIONS

Asem Othman and Arun Ross: "Mixing Fingerprints for Generating Virtual Identities", Proc. of IEEE International Workshop on Information Forensics and Security (WIFS), (Foz do Iguacu, Brazil) Nov./Dec. 2011, all pages.

Sheng Li and Alex C. Kot: "Finger print Combination for Privacy Protection", IEEE Transactions on Information Forensic and Security, vol. 8, No. 2, Feb. 2013, pp. 350-360.

* cited by examiner

SENSING CHARACTERISTICS OF ADJACENT FINGERS FOR USER AUTHENTICATION

BACKGROUND

One way in which access to systems or devices can be controlled is through authentication of the user, such as by capturing a user's fingerprint with a fingerprint sensor and authenticating the captured fingerprint. However, current fingerprint sensors are not without their problems. One such problem is that fingerprint authentication oftentimes requires a high resolution fingerprint sensor in order to capture sufficient data identifying the pattern of the fingerprint. The use of such high resolution fingerprint sensors can be expensive in terms of both price and power usage, reducing the desirability of using such fingerprint sensors in devices.

BRIEF DESCRIPTION OF THE DRAWINGS

Embodiments of sensing characteristics of adjacent fingers for user authentication are described with reference to the following drawings. The same numbers are used throughout the drawings to reference like features and components.

DETAILED DESCRIPTION

Sensing characteristics of adjacent fingers for user authentication is discussed herein. For authentication of a user, fingerprint data for two or more of the user's fingers is sensed by a fingerprint sensor. Each of these two or more fingers is situated adjacent to at least one other of the two or more fingers while the fingerprint data is being sensed by the fingerprint sensor. Various characteristics of the user's fingers can be evaluated as part of the user authentication, such as the length of the user's fingers relative to one another, the width of the user's fingers relative to one another, the locations of minutiae of one of the user's fingerprints relative to the locations of minutiae of other of the user's fingerprints, and so forth.

Figure 1:
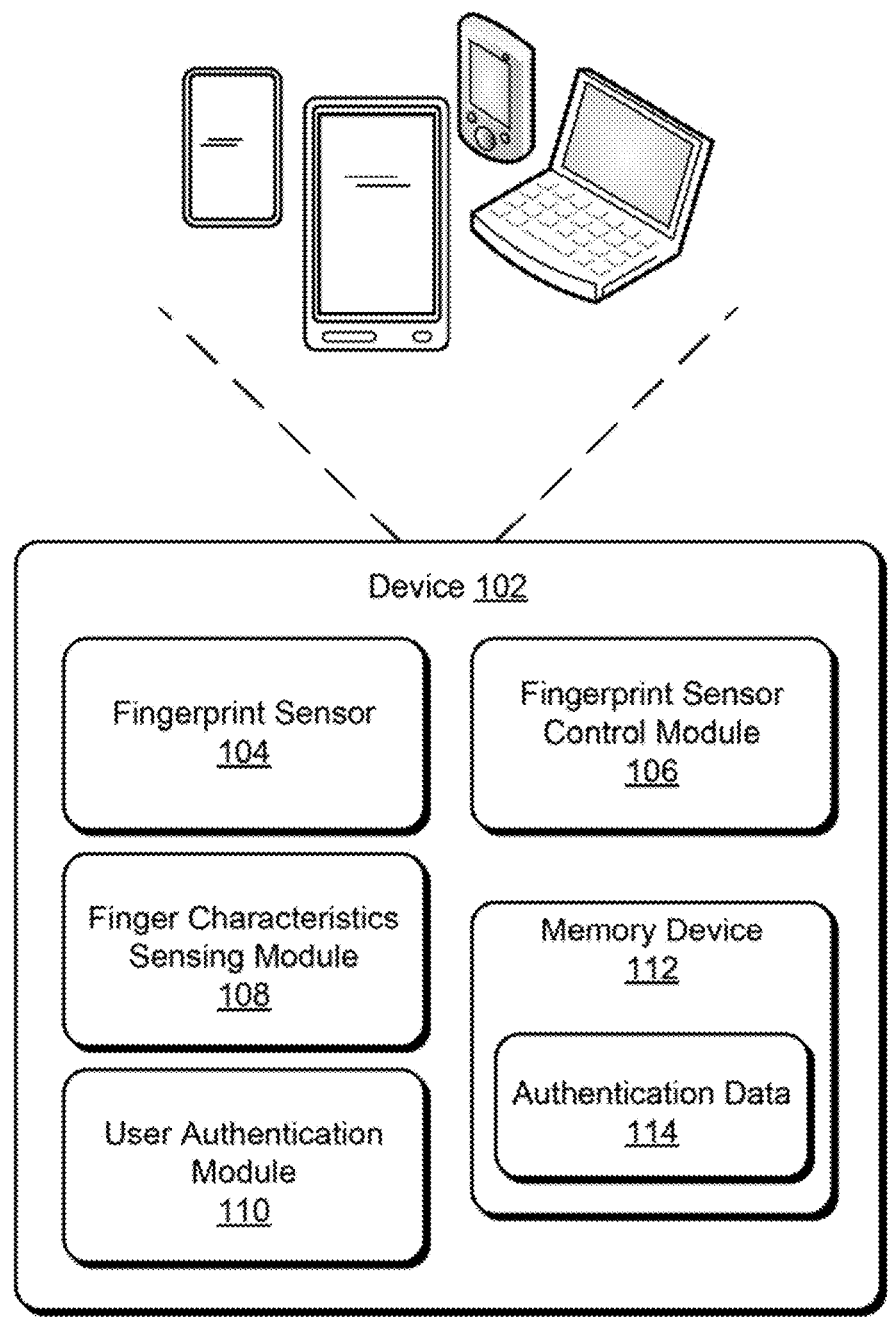
FIG. 1 illustrates an example device implementing the sensing characteristics of adjacent fingers for user authentication in accordance with one or more embodiments.

FIG. 1 illustrates an example device 102 implementing the sensing characteristics of adjacent fingers for user authentication in accordance with one or more embodiments. The device 102 can be any of a variety of different types of devices, such as a laptop computer, a cellular or other wireless phone, a tablet computer, an entertainment device, an audio and/or video playback device, a server computer, and so forth. The device 102 includes a fingerprint sensor 104, a fingerprint sensor control module 106, a finger characteristics sensing module 108, a user authentication module 110, and a memory device 112 with authentication data 114.

The fingerprint sensor 104 senses fingerprint data of multiple fingers of a user touching the sensor 104. The fingerprint data contains a fingerprint's pattern on each of the fingers, allowing the location of various minutiae of the fingerprint as well as the outline or shape of the fingers to be identified. The minutiae of the fingerprint refer to, for example, the ridge endings and bifurcations of the fingerprint. The minutiae of the fingerprint can optionally include additional details, such as the points at which scars begin, the points at which scars end, and so forth. The fingerprint sensor 104 can be implemented using any of a variety of different technologies and types of sensors, such as capacitive sensors, pressure sensors, optical sensors, thermal sensors, ultrasonic sensors, imaging sensors, and so forth. For example, the fingerprint sensor 104 can be an indium tin oxide (ITO) sensor. The fingerprint sensor 104 can sense the fingerprint data for multiple fingers concurrently, or can sense the fingerprint data for multiple fingers over time as a user swipes his or her fingers across the sensor 104 as discussed in more detail below. The fingerprint sensor 104 can also optionally be part of a sensor structure that includes one or more layers providing various additional functionality, such as protection from scratches and abrasions, feedback regarding a user touching the fingerprint sensor 104, and so forth.

The fingerprint sensor 104 can optionally be an adaptive sensor that operates in multiple different resolution modes, such as a high resolution mode (e.g., having a resolution of hundreds of dots per inch) and a low resolution mode (e.g., having a resolution of tens of dots per inch). The fingerprint sensor control module 106 controls the fingerprint sensor 104, and can activate the high resolution mode for one or more portions of the fingerprint sensor 104 while one or more other portions of the fingerprint sensor 104 remain in the low resolution mode.

The finger characteristics sensing module 108 receives the fingerprint data, also referred to as the sensed fingerprint data, from the fingerprint sensor 104. In one embodiment, this fingerprint data is an indication of the locations where different portions of the surface of the finger are sensed as protruding further than other portions, these protruding portions resulting in the fingerprint's pattern. The locations can be identified in various different manners, such as using a 2-dimensional Cartesian coordinate system in which the locations where protrusions are sensed are identified (e.g., a grid or matrix of values corresponding to sensor locations can be used, with one value (e.g., a value of 1) in the grid or matrix indicating a protrusion is sensed at the corresponding location, and another value (e.g., a value of 0) in the grid or matrix indicating a protrusion is not sensed at the corresponding location). Alternatively, other coordinate systems can be used, such as Polar coordinate systems, proprietary coordinate systems, and so forth. The fingerprint data can alternatively take other forms, such as an image of the surface of the fingers.

The finger characteristics sensing module 108 identifies, based on the sensed fingerprint data, various finger characteristics of the user's fingers sensed by the fingerprint sensor 104. These finger characteristics can include, for example, the general shape of the fingers (e.g., the lengths and widths of the fingers relative to one another), the locations of boundaries between fingers, the locations of minutiae in a fingerprint relative to the locations of other minutiae in the same fingerprint, the locations of minutiae in a fingerprint relative to the locations of minutiae in one or more other fingerprints, and so forth.

Various data regarding the user's finger characteristics is stored in the memory device 112, which can be volatile and/or nonvolatile memory (e.g., RAM, Flash memory, magnetic disk, etc.), as authentication data 114. The authentication data 114 includes data indicating one or more correct or representative finger characteristic samples for a user. Finger characteristic samples can be stored as part of the authentication data 114 during an enrollment process, which refers to a process during which the user is setting up or initializing the device 102 to authenticate his or her fingerprint. Finger characteristic samples can also be stored at other times, such as in response to a user being authenticated using the techniques discussed herein. For example, each time the user is successfully authenticated, the finger characteristics sensed during that authentication process can be combined (e.g., averaged) with the previously stored authentication data.

The finger characteristics module 108 generates data identifying the finger characteristics and makes the generated data available to the user authentication module 110. The user authentication module 110 analyzes the finger characteristics identified by the module 108 and compares the identified characteristics to one or more stored finger characteristic samples maintained as part of the authentication data 114. Based on this comparison, the finger authentication module 110 determines whether the finger characteristics identified by the module 108 satisfy the authentication data 114. If the finger characteristics satisfy the authentication data (e.g., the finger characteristics match stored finger characteristics data), then the user authentication succeeds and the user is authenticated. However, if the finger characteristics do not satisfy the authentication data (e.g., the finger characteristics do not match stored finger characteristics data), then the user authentication fails and the user is not authenticated.

The user authentication module 110 can make this comparison in different manners in accordance with various different embodiments. In one embodiment, the authentication module 110 compares the finger characteristics identified by the sensing module 108 to the authentication data 114 and determines whether the identified finger characteristics match stored finger characteristics data for the user.

The authentication module 110 can determine whether two sets or samples of finger characteristics (e.g., finger characteristics identified by the sensing module 108 and finger characteristics stored as the authentication data 114) match in various different manners. In one embodiment, the finger characteristics (e.g., locations of minutiae, finger widths, relative finger lengths) in the two finger characteristics samples are compared. If a number of corresponding finger characteristics in the two finger characteristics satisfies (e.g., is equal to and/or greater than) a threshold value then the two finger characteristics samples match; otherwise, the two finger characteristics samples do not match. The number of corresponding finger characteristics in the two finger characteristics samples can be, for example, a number of corresponding locations in the two finger characteristics samples where minutiae are located, a number of finger widths or lengths, and so forth. In another embodiment, rather than relying on whether the number of corresponding finger characteristics in the two finger characteristics satisfies a threshold value, various public and/or proprietary pattern matching techniques can be used to compare patterns in the two finger characteristics samples (e.g., patterns of minutiae) and determine whether the two finger characteristics samples match.

It should be noted that user authentication can be performed by the device 102 for its own use and/or used by another system or device. For example, the user authentication module 110 can authenticate a user in order to allow the user to access the device 102 itself, programs or applications running on the device 102, other modules or components of the device 102, and so forth. Alternatively, the module 110 can authenticate a user in order to allow the user to access another system or device coupled to the device 102, another system or device accessed by the device 102 via the Internet or other network, and so forth.

Figure 2:
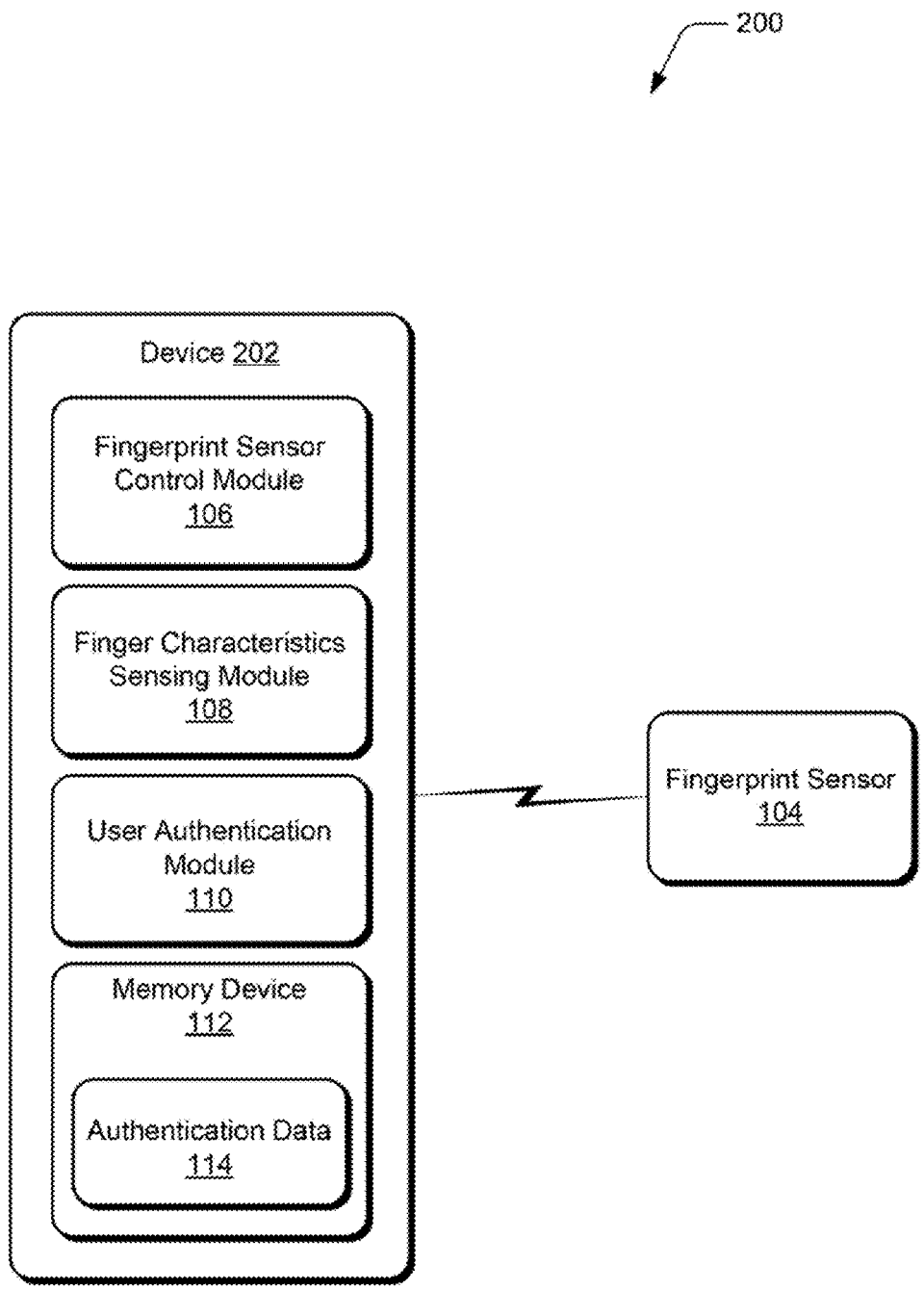
FIG. 2 illustrates another example system implementing the sensing characteristics of adjacent fingers for user authentication in accordance with one or more embodiments.

FIG. 2 illustrates an example system 200 implementing the sensing characteristics of adjacent fingers for user authentication in accordance with one or more embodiments. The system 200 includes a device 202 that can be any of a variety of different types, analogous to the discussion of device 102 of FIG. 1. The device 202 is similar to the device 102 of FIG. 1, and includes a fingerprint sensor control module 106, a finger characteristics sensing module 108, a user authentication module 110, and a memory device 112 with the authentication data 114. However, the device 202 differs from the device 102 in that the device 202 does not include the fingerprint sensor 104.

In system 200, the fingerprint sensor 104 is implemented separately from the device 202, and provides fingerprint data to the device 202. This data can be provided via a variety of different communication channels, including wired communication channels (e.g., Universal Serial Bus (USB) connections) and/or wireless communication channels (e.g., wireless USB connections or Bluetooth connections). In one or more embodiments, the fingerprint sensor 104 is implemented as a wearable device, such as being implemented as part of a watch or other jewelry that communicates with the device 202 implemented as another wearable device.

In the illustrated example of FIG. 2, the fingerprint sensor control module 106, the finger characteristics sensing module 108, the user authentication module 110, and the memory device 112 are included as part of the device 202. Alternatively, at least part of the module 106, at least part of the module 108, at least part of the module 110, and/or at least part of the memory device 112 can be included in the same device as the fingerprint sensor 104.

Figure 3:
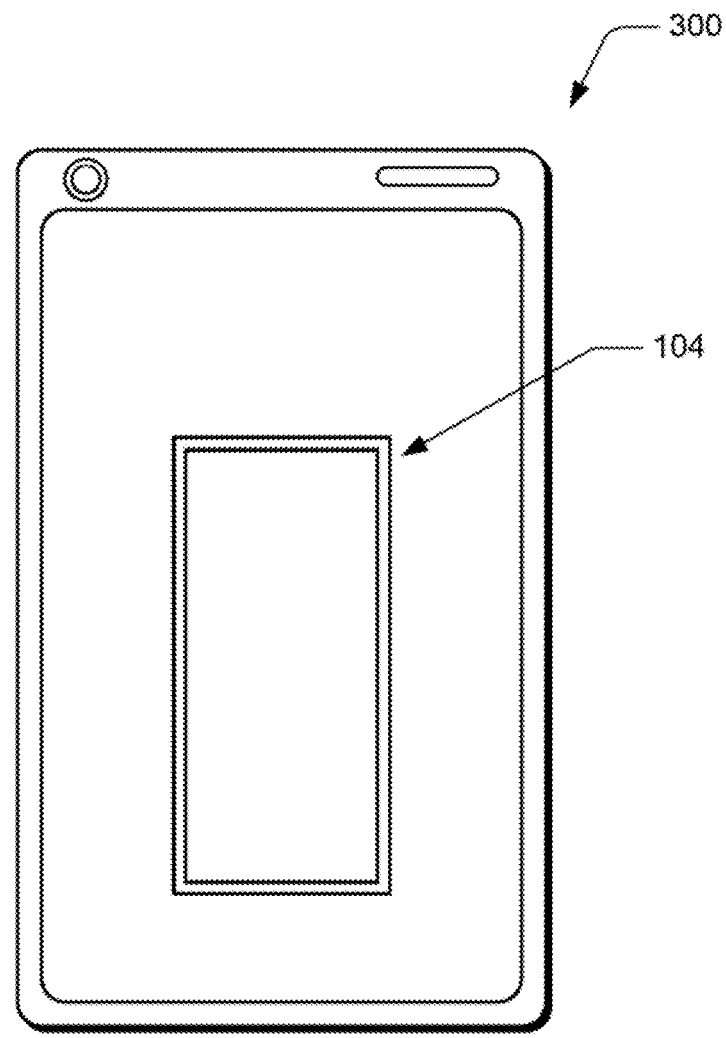
FIGS. 3 and 4 illustrate example devices that include a fingerprint sensor in accordance with one or more embodiments.

FIG. 3 illustrates an example device 300 that includes a fingerprint sensor 104 in accordance with one or more embodiments. The device 300 is, for example, a mobile device such as a wireless phone. The fingerprint sensor 104 is implemented on one side of the device 300, such as on the back of the phone. The device 300 can also include a fingerprint sensor control module, a finger characteristics sensing module, a user authentication module, and a memory device with authentication data, analogous to device 102 of FIG. 1.

Alternatively, the device 300 need not include a fingerprint sensor control module, a finger characteristics sensing module, a user authentication module, and a memory device with authentication data, but can provide fingerprint data sensed by the fingerprint sensor 104 to another device, such as a device 202 of FIG. 2.

Figure 4:
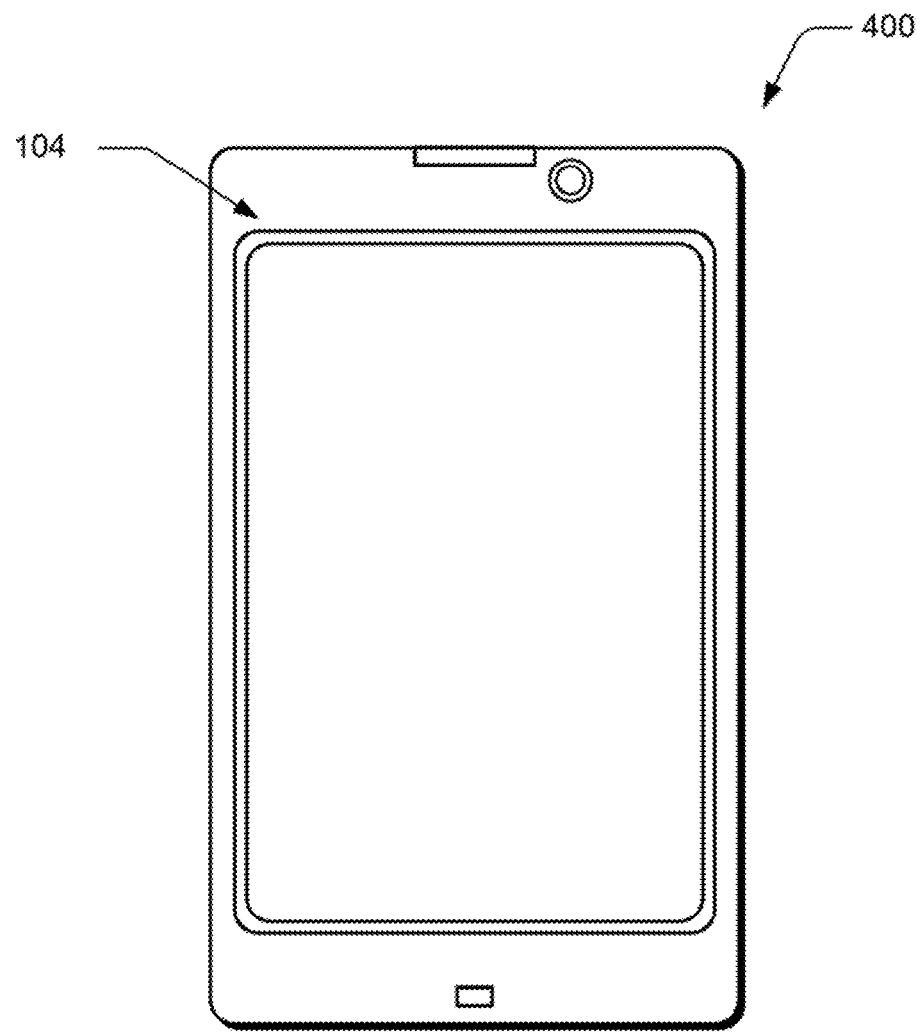

FIG. 4 illustrates another example device 400 that includes a fingerprint sensor 104 in accordance with one or more embodiments. The device 400 is, for example, a mobile device with a fingerprint sensor 104, such as a wireless phone or a tablet. In the example of FIG. 4, the fingerprint sensor 104 is a user interface component, such as a touchscreen, via which a user can provide inputs to the device 400 and via which content can be displayed to a user of the device 400. Thus, the fingerprint sensor 104 operates as a conventional touchscreen as well as a fingerprint sensor. The device 400 can also include a fingerprint sensor control module, a finger characteristics sensing module, a user authentication module, and a memory device with authentication data, analogous to device 102 of FIG. 1. Alternatively, the device 400 need not include a fingerprint sensor control module, a finger characteristics sensing module, a user authentication module, and a memory device with authentication data, but can provide fingerprint data sensed by the fingerprint sensor to another device, such as a device 202 of FIG. 2.

Figure 5:
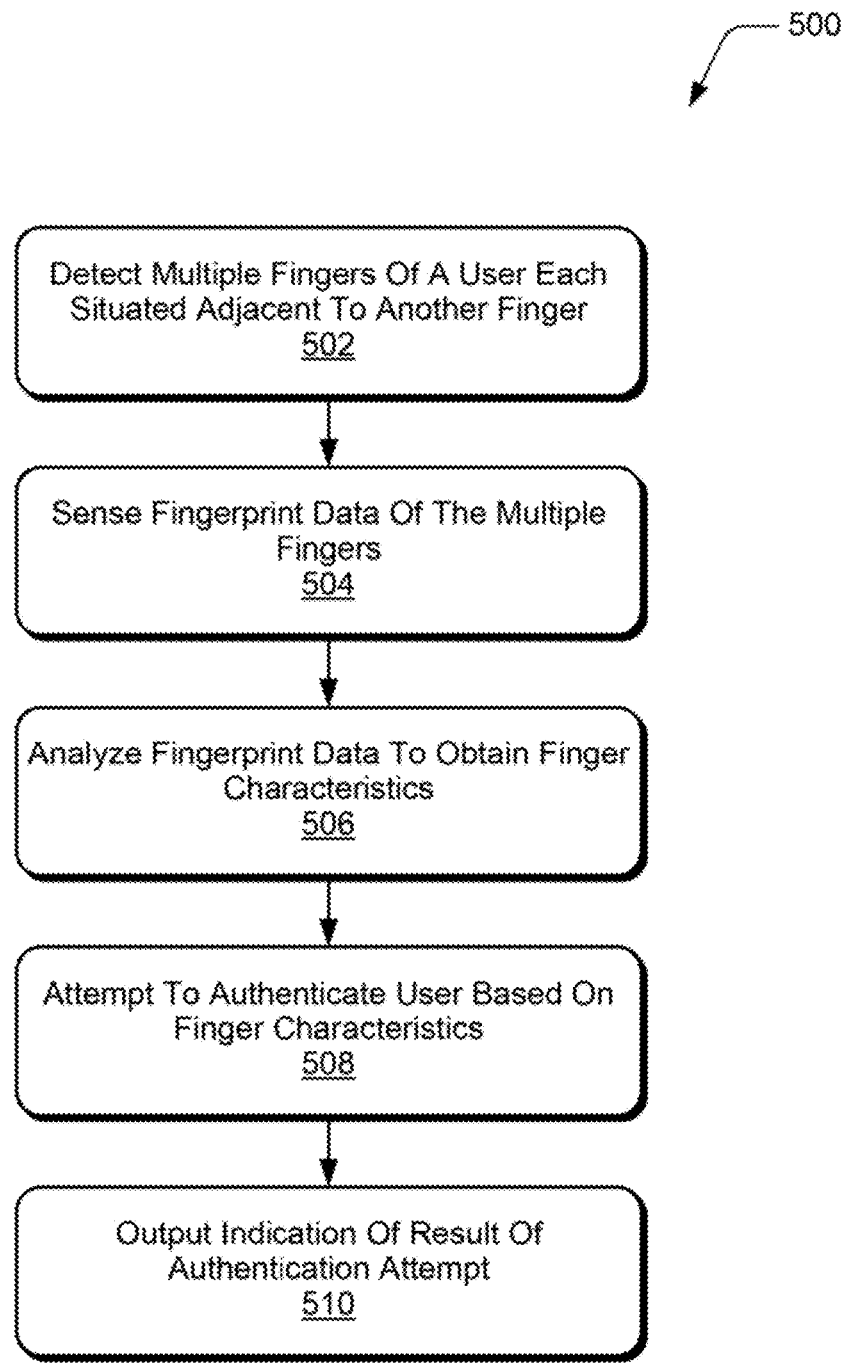
FIG. 5 illustrates an example process implementing the sensing characteristics of adjacent fingers for user authentication in accordance with one or more embodiments.

FIG. 5 illustrates an example process 500 implementing the sensing characteristics of adjacent fingers for user authentication in accordance with one or more embodiments. Process 500 is implemented by one or more devices or sensors, such as by the device 102 of FIG. 1, by the device 202 and the fingerprint sensor 104 of FIG. 2, and so forth. Process 500 can be implemented in software, firmware, hardware, or combinations thereof. Process 500 is shown as a set of acts and is not limited to the order shown for performing the operations of the various acts. Process 500 is an example of implementing the sensing characteristics of adjacent fingers for user authentication; additional discussions of implementing the sensing characteristics of adjacent fingers for user authentication are included herein with reference to different Figures.

In process 500, multiple fingers of a user are detected by the fingerprint sensor 104, each finger being situated adjacent to another finger (act 502). Depending on the manner in which the fingerprint sensor 104 is implemented, in act 502 the multiple fingers can be detected as touching a surface of the fingerprint sensor 104 or alternatively as being in close proximity to (e.g., within five millimeters of) the surface of the fingerprint sensor 104.

The fingerprint sensor 104 senses fingerprint data for at least two of the multiple fingers detected by the fingerprint sensor (act 504). The fingerprint data can be sensed in various different manners based on the technology and type of the fingerprint sensor.

Each of the multiple fingers for which fingerprint data is sensed in act 504 is situated adjacent to at least one other of the multiple fingers while the fingerprint data is sensed. Two fingers being situated adjacent to one another refers to the fingers being positioned next to (or within a threshold distance) of the other, such as the fingers physically touching each other.

Figure 6:
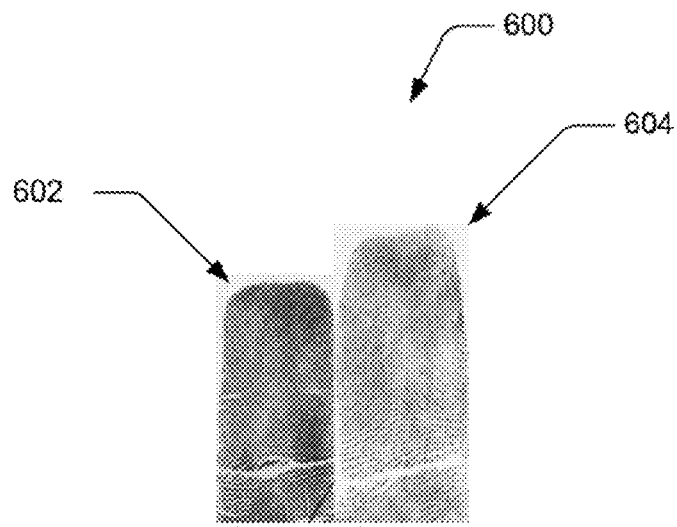
FIG. 6 illustrates example fingerprint data sensed for two fingers in accordance with one or more embodiments.

FIG. 6 illustrates example fingerprint data 600 sensed for two fingers in accordance with one or more embodiments. The fingerprint data 600 includes fingerprint data for two fingers, such as index finger data 602 and middle finger data 604. As illustrated, the index finger and middle finger are situated adjacent to one another when the fingerprint data is sensed.

Figure 7:
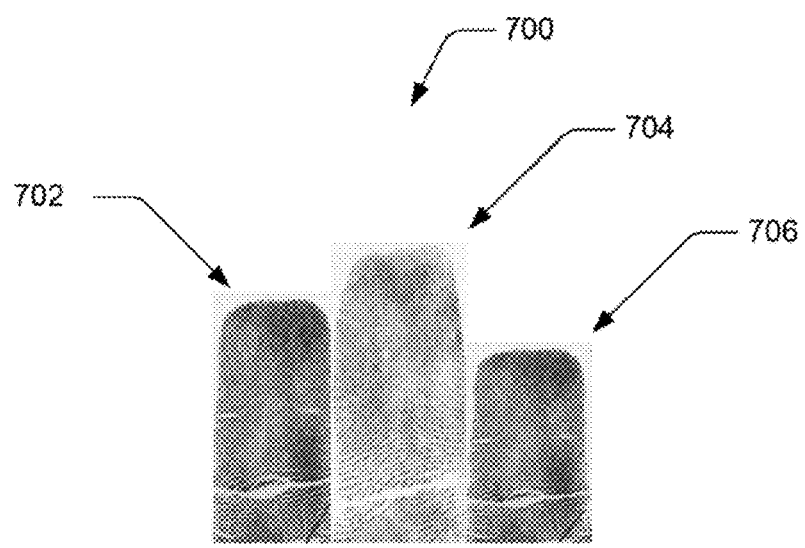
FIG. 7 illustrates example fingerprint data sensed for three fingers in accordance with one or more embodiments.

FIG. 7 illustrates example fingerprint data 700 sensed for three fingers in accordance with one or more embodiments. The fingerprint data 700 includes fingerprint data for three fingers, such as index finger data 702, middle finger data 704, and ring finger data 706. As illustrated, each of the index finger, middle finger, and ring finger is situated adjacent to at least one other of the index finger, middle finger, and ring finger when the fingerprint data is sensed.

Returning to FIG. 5, the fingerprint data for the multiple fingers can be sensed in act 504 in a variety of different manners. In one embodiment, the fingerprint sensor 104 senses the fingerprint data for the multiple fingers concurrently. Sensing the fingerprint data for the multiple fingers concurrently refers to substantially all of the fingerprint data for the multiple fingers being sensed at approximately the same time without need for (and typically without) the user moving his or her fingers across the fingerprint sensor 104.

In another embodiment, the fingerprint sensor 104 senses the fingerprint data for multiple fingers over time as a user swipes his or her fingers across the sensor. Thus, the fingerprint sensor 104 can have a surface size smaller than the fingerprint of the user because substantially all of the fingerprint data for the multiple fingers need not be sensed at approximately the same time.

Figure 8:
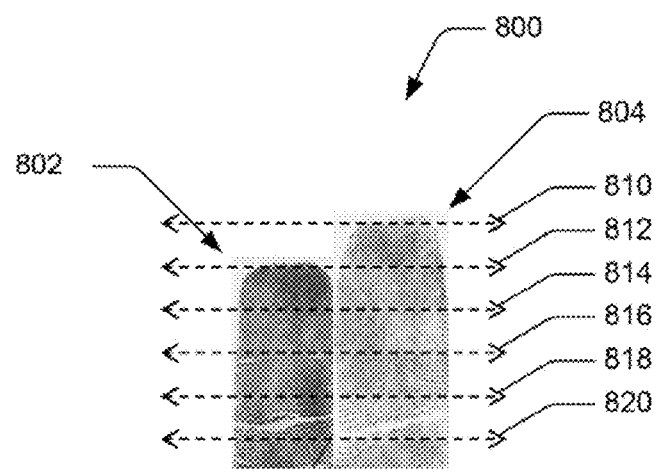
FIG. 8 illustrates another example of fingerprint data sensed for two fingers in accordance with one or more embodiments.

FIG. 8 illustrates example fingerprint data 800 sensed for two fingers in accordance with one or more embodiments. The fingerprint data 800 includes fingerprint data for two fingers, such as index finger data 802 and middle finger data 804. As illustrated, the index finger and middle finger are situated adjacent to one another when the fingerprint data is sensed. Multiple horizontal lines 810, 812, 814, 816, 818, and 820 are shown to illustrate portions of the fingerprint data that are sensed as the fingers are moved across the sensor 104. For example, as the user moves his or her fingers across the sensor 104, the fingerprint data at line 820 is sensed, then the fingerprint data at line 818 is sensed, then the fingerprint data at line 816 is sensed, and so forth.

In another embodiment, the fingerprint sensor 104 senses the fingerprint data for multiple fingers over time as a scanning component of the sensor 104 moves. The user need not, and typically does not, move his or her fingers across the fingerprint sensor 104. The fingerprint data is sensed in multiple portions analogous to that illustrated in FIG. 8, except that the multiple fingers remain stationary while the scanning component moves rather than the multiple fingers moving while the sensor remains stationary.

Returning to FIG. 5, in one embodiment the fingerprint sensor 104 operates in a high resolution mode (e.g., having a resolution of hundreds of dots per inch). In this embodiment, the fingerprint sensor 104 need not support a low resolution mode, and the device need not include a fingerprint sensor control module 106 to activate a high resolution mode or a low resolution mode for different portions of the fingerprint sensor 104.

In another embodiment, the fingerprint sensor 104 is adaptive and can operate in multiple different resolution modes, such as a high resolution mode (e.g., having a resolution of hundreds of dots per inch) and a low resolution mode (e.g., having a resolution of tens of dots per inch). In this embodiment, the fingerprint sensor control module 106 can activate the fingerprint sensor 104 to operate in the high resolution mode when sensing fingerprint data, and operate in the low resolution mode at other times. The fingerprint sensor control module 106 can determine when the fingerprint sensor 104 is to sense fingerprint data in different manners, such as each time the device is powered on, in response to another component or module providing an indication that the user is to be authenticated, and so forth. After the fingerprint data has been sensed, the fingerprint sensor control module 106 can activate the fingerprint sensor 104 to operate in the low resolution mode.

In another embodiment, different portions of the fingerprint sensor 104 can operate in different resolution modes concurrently. For example, the fingerprint sensor control module 106 can activate the high resolution mode for one or more portions of the fingerprint sensor 104 while activating the low resolution mode for one or more other portions of the fingerprint sensor 104. In this embodiment, the one or more portions of the fingerprint sensor 104 that are in the high resolution mode are the one or more portions of the fingerprint sensor 104 where fingerprints of the user are expected to be located.

The portions of the fingerprint sensor 104 where fingerprints of the user are expected to be located can be determined in different manners. For example, a corner or other portion of a touchscreen may be used for sensing fingerprint data, and the corner or other portion made known to the user so he or she knows where to position his or her fingers. The size of the portion can vary, such as if fingerprint data for two fingers is expected then the size of the portion can be smaller than if the fingerprint data for three fingers is expected. The number of fingers for which fingerprint data is expected can be determined in different manners. For example, the user authentication module 110 may rely on fingerprint data for two fingers to authenticate a user for certain operations and rely on fingerprint data for three fingers to authenticate the user for other operations. The user authentication module 110 notifies the fingerprint sensor control module 106 of the number of fingers the user authentication module 110 is using to authenticate the user, thus notifying the fingerprint sensor control module 106 of the number of fingers for which fingerprint data is expected.

Alternatively, the portions of the fingerprint sensor 104 where fingerprints of the user are expected to be located and/or the sizes of such portions can be determined in other manners. For example, the fingerprint sensor 104 can sense fingerprint data in the low resolution mode, and the finger characteristics sensing module 108 can use this sensed fingerprint data to determine the shape of the fingers being sensed and/or a quantity of fingers being sensed (e.g., based on how many boundary lines are identified, as discussed below). The finger characteristics sensing module 108 can notify the fingerprint sensor control module 106 of the portions of the fingerprint sensor 104 that are sensing the fingers, and the fingerprint sensor control module 106 can activate the high resolution mode for those portions of the fingerprint sensor 104 for sensing the fingers. These portions of the fingerprint sensor 104 activated for the high resolution mode can be, for example, areas of minutiae of each finger as discussed in more detail below.

Regardless of the manner in which the fingerprint data of the multiple fingers is sensed, the sensed fingerprint data is analyzed to obtain finger characteristics of the multiple fingers (act 506). Generally, these finger characteristics identify the shape, size, and minutiae of the fingers. For example, these finger characteristics can include the general shape of the fingers (e.g., the lengths and widths of the fingers relative to one another), the locations of boundaries between fingers, the locations of minutiae in a fingerprint relative to the locations of other minutiae in the same fingerprint, the locations of minutiae in a fingerprint relative to the locations of minutiae in one or more other fingerprints, and so forth.

An attempt is made to authenticate the user based on the obtained finger characteristics of the multiple fingers (act 508). The attempt is made by comparing the obtained finger characteristics to one or more stored finger characteristic samples maintained as part of the authentication data (e.g., the authentication data 114 of FIG. 1). An indication of a result of the authentication attempt is output (act 510). If the finger characteristics satisfy the authentication data (e.g., the finger characteristics match stored finger characteristics data), then the attempt is successful and an indication of successful authentication is output in act 510. However, if the finger characteristics do not satisfy the authentication data (e.g., the finger characteristics do not match stored finger characteristics data), then the attempt is unsuccessful and a general indication of failed authentication is output in act 510. The indication in act 510 can be output to a variety of different entities, such as another component or module of the device implementing process 500, another device or service than the device implementing process 500, a user of the device implementing process 500, and so forth.

It should be noted that the authentication attempt in act 508 can be performed in the absence of identifying any centroids of the fingerprints as well as in the absence of rotating and/or scaling the minutiae of a fingerprint in an attempt to orientate an identified fingerprint with a stored fingerprint. Rather, the authentication attempt can be based on relative locations of minutiae identified with reference to a boundary line separating two fingers and/or a reference location determined based on the boundary line and the locations of tips of the fingers, as discussed in more detail below. Thus, computational time and power need not be expended to identify centroids of fingerprints or rotate fingerprints in order to authenticate a user using the techniques discussed herein.

Figure 9:
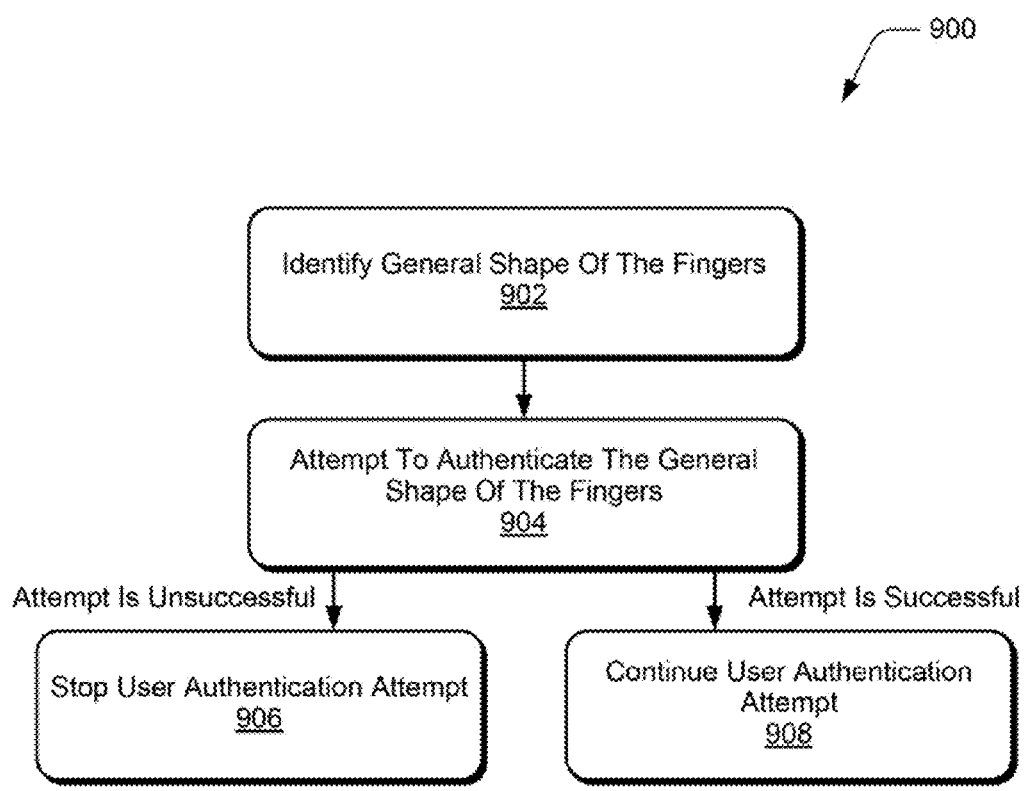
FIG. 9 illustrates an example process implementing finger shape analysis in accordance with one or more embodiments.

In one or more embodiments, the general shape of the fingers is analyzed when attempting to authenticate the user prior to analyzing minutiae of the fingerprints. FIG. 9 illustrates an example process 900 implementing the finger shape analysis in accordance with one or more embodiments. Process 900 is implemented by one or more devices or sensors, such as by the device 102 of FIG. 1, by the device 202 and the fingerprint sensor 104 of FIG. 2, and so forth. Process 900 can be implemented in software, firmware, hardware, or combinations thereof. Process 900 is shown as a set of acts and is not limited to the order shown for performing the operations of the various acts. Process 900 is an example of implementing the finger shape analysis; additional discussions of implementing the finger shape analysis are included herein with reference to different Figures.

Figure 10:
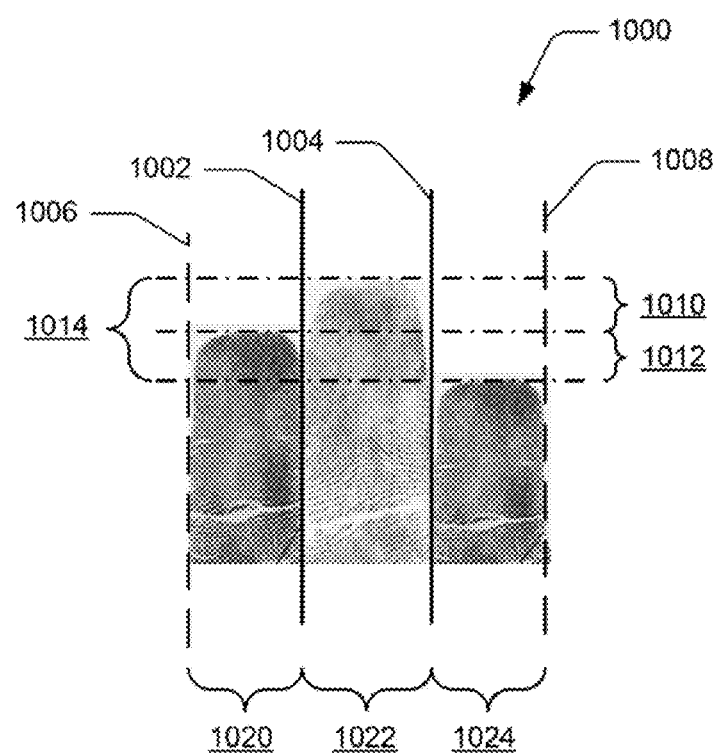
FIG. 10 illustrates an example of identifying the general shape of the fingers in accordance with one or more embodiments.

In process 900, the general shape of the fingers is identified (act 902). This general shape can be identified in different manners, and in one embodiment is identified by determining the lengths and widths of the fingers relative to one another. FIG. 10 illustrates an example of identifying the general shape of the fingers in accordance with one or more embodiments. In the example of FIG. 10, fingerprint data 1000 is sensed for three fingers. The fingerprint data 1000 includes fingerprint data for three fingers, such as an index finger on the left, a middle finger in the middle, and a ring finger on the right. As illustrated, each of the index finger, middle finger, and ring finger is situated adjacent to at least one other of the index finger, middle finger, and ring finger when the fingerprint data is sensed. Although FIG. 10 is discussed with reference to three fingers, the finger shape analysis techniques can be used to identify the general shape in situations in which two fingers or all fingers are sensed.

The fingerprint data is analyzed to identify boundary lines between fingers, illustrated as boundary lines 1002 and 1004. The boundary lines 1002 and 1004 can be identified as areas in the fingerprint data in the shape of an approximately straight line where no portions of the surface of the finger are sensed as protruding further than other portions. These areas where the boundary lines occur are boundaries between adjacent fingers, and can be identified using any of a variety of different public and/or proprietary techniques, including pattern recognition techniques, data analysis techniques, and so forth.

Each of the boundary lines 1002 and 1004 is an edge of at least one finger. In addition to identifying the boundary lines, the fingerprint data is analyzed to identify the other edges of the fingers, such as a leftmost edge line 1006 of the index finger and a rightmost edge line 1008 of the ring finger. These other edges of the fingers can be identified in different manners. For example, the fingerprint data can be analyzed in a direction normal to and to the left of the boundary line 1002. An area in the fingerprint data in that direction that is in the shape of an approximately straight line where no portions of the surface of the finger are sensed as protruding further than other portions and that is approximately parallel to the boundary line 1002 is the leftmost edge line 1006. Similarly, the fingerprint data can be analyzed in a direction normal to and to the right of the boundary line 1004. An area in the fingerprint data in that direction that is in the shape of an approximately straight line where no portions of the surface of the finger are sensed as protruding further than other portions and that is approximately parallel to the boundary line 1004 is the rightmost edge line 1008. These areas can be identified using any of a variety of different public and/or proprietary techniques, including pattern recognition techniques, data analysis techniques, and so forth.

The fingerprint data can also be analyzed to identify the tips or ends of the fingers. The tips or ends of the fingers can be identified based on areas where no portions of the surface of the finger are sensed as protruding further than other portions, analogous to identifying the areas for the boundary lines and edge lines. The length of fingers relative to one another can be determined as the difference in lengths of the fingers, which can be readily identified based on the locations of the tips of the fingers. For example, a distance 1010 is the difference in length between the middle finger and index finger, a distance 1012 is the difference in length between the index finger and ring finger, and a distance 1014 is the difference in length between the middle finger and ring finger. Similarly, the difference in widths of the fingers can be readily identified based on the boundary lines and edge lines. For example, a distance 1020 is the width of the index finger, a distance 1022 is the width of the middle finger, and a distance 1024 is the width of the ring finger. The widths of the fingers relative to one another can be determined as the difference in widths of the fingers.

Returning to FIG. 9, an attempt is made to authenticate the general shape of the fingers (act 904). This attempt is made by comparing the obtained finger characteristics to one or more stored finger characteristic samples maintained as part of authentication data (e.g., the authentication data 114 of FIG. 1), with the finger characteristics being the general shape of the fingers as discussed above.

If the attempt to authenticate the general shape of the fingers is unsuccessful, then the user authentication attempt stops (act 906) and is unsuccessful. No further analysis of the fingerprint data need be performed. Thus, if the general shape of the fingers is not authenticated, the user authentication fails and additional processing power and time to analyze minutiae of the fingerprints need not be expended.

However, if the attempt to authenticate the general shape of the fingers is successful, then the user authentication attempt continues (act 908). The user authentication attempt may be successful or unsuccessful, depending on analysis of the fingerprint minutiae as discussed in more detail below.

It should also be noted that the general shape of the fingers can also include a quantity of fingers that are sensed. The quantity of fingers sensed can be readily identified based on the number of boundary lines (e.g., two fingers if one boundary line, three fingers if two boundary lines).

Although the discussions above include descriptions of the general shape of the fingers being authenticated based on the lengths and widths of the fingers relative to one another, various other techniques can be used. For example, an outline of the fingers can be generated as the general shape of the fingers (e.g., including the boundary lines, edge lines, and additional lines following the contour of the tips of the fingers). The outline of the fingers can be compared to authentication data using various public and/or proprietary pattern matching techniques to determine whether the general shape of the fingers matches the authentication data, and the attempt being successful if the general shape matches the authentication data and the attempt being unsuccessful if the general shape does not match the authentication data.

Figure 11:
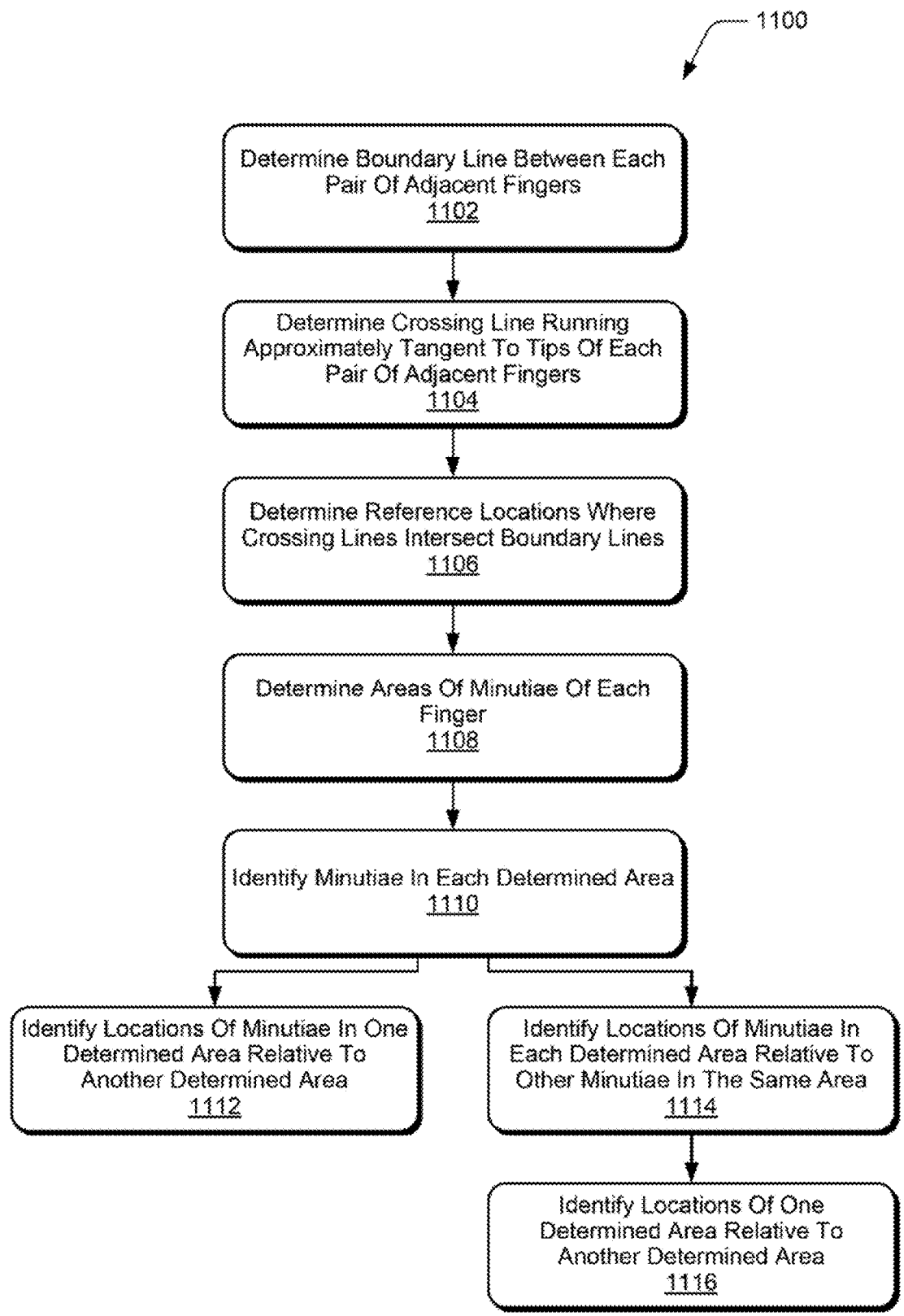
FIG. 11 illustrates an example process for obtaining finger characteristics in accordance with one or more embodiments.

FIG. 11 illustrates an example process 1100 for obtaining finger characteristics in accordance with one or more embodiments. In one embodiment, process 1100 is implemented in response to the attempt to authenticate the general shape of the fingers in act 904 of FIG. 9 being successful. In another embodiment, process 900 of FIG. 9 need not be performed, and process 1100 is performed without any attempt to authenticate the general shape of the fingers having been performed.

Process 1100 implements the analysis of act 506 of FIG. 5, and is implemented by one or more devices or sensors, such as by the device 102 of FIG. 1, by the device 202 and the fingerprint sensor 104 of FIG. 2, and so forth. Process 1100 can be implemented in software, firmware, hardware, or combinations thereof. Process 1100 is shown as a set of acts and is not limited to the order shown for performing the operations of the various acts. Process 1100 is an example of obtaining finger characteristics; additional discussions of obtaining finger characteristics are included herein with reference to different Figures.

In process 1100, the boundary line between each pair of adjacent fingers is determined (act 1102). A boundary line can be determined in the same manner as discussed above with respect to process 900 of FIG. 9. In embodiments in which process 900 is performed before process 1100, the boundary lines determined in act 1102 can be the boundary lines determined in process 900 of FIG. 9.

A crossing line running approximately tangent to the tips of each pair of adjacent fingers is also determined (act 1104). These one or more crossing lines can be readily generated based on the locations of the tips or ends of the fingers, which can be determined as discussed above in process 900 of FIG. 9.

Figure 12:
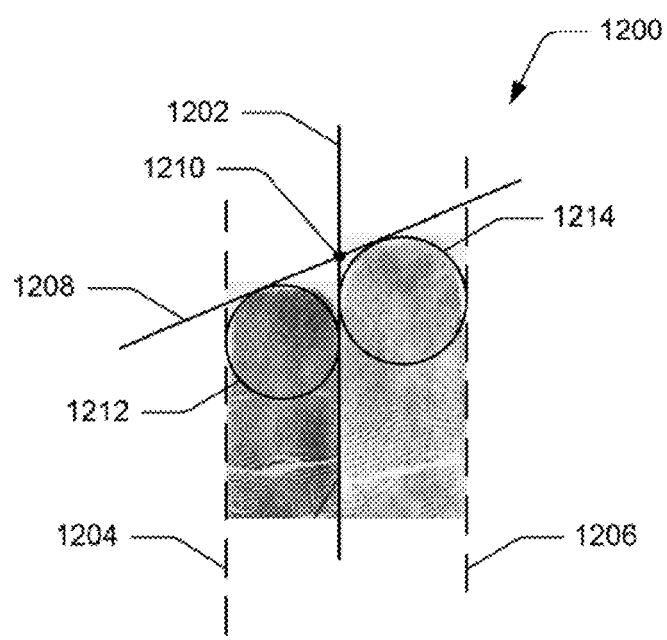
FIG. 12 illustrates another example of fingerprint data sensed for two fingers in accordance with one or more embodiments.

FIG. 12 illustrates example fingerprint data 1200 sensed for two fingers in accordance with one or more embodiments. The fingerprint data 1200 includes fingerprint data for two fingers, such as an index finger on the left and a middle finger on the right. As illustrated, the index finger and middle finger are situated adjacent to one another when the fingerprint data is sensed. A boundary line 1202 between the two fingers is determined, and edge lines 1204 and 1206 can also be determined. A crossing line 1208 running approximately tangent to the tips of the index finger and middle finger is also determined.

Figure 13:
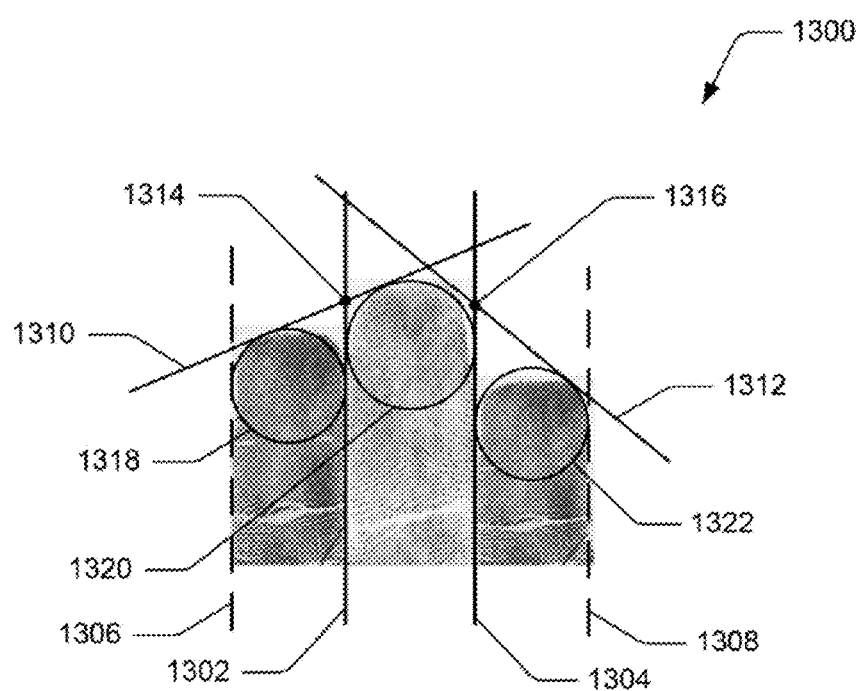
FIG. 13 illustrates another example of fingerprint data sensed for three fingers in accordance with one or more embodiments.

FIG. 13 illustrates example fingerprint data 1300 sensed for three fingers in accordance with one or more embodiments. The fingerprint data 1300 includes fingerprint data for three fingers, such as an index finger on the left, a middle finger in the middle, and a ring finger on the right. As illustrated, the index finger and middle finger are situated adjacent to one another when the fingerprint data is sensed, and the middle finger and ring finger are situated adjacent to one another when the fingerprint data is sensed. Boundary lines 1302 and 1304 between adjacent pairs of fingers are determined, and edge lines 1306 and 1308 can also be determined. A crossing line 1310 running approximately tangent to the tips of the index finger and middle finger is determined, and a crossing line 1312 running approximately tangent to the tips of the middle finger and ring finger is also determined.

Returning to FIG. 11, reference locations are determined as each location at which a crossing line running approximately tangent to the tips of two adjacent fingers intersects the boundary line between those two adjacent figures (act 1106). In FIG. 12, a reference location 1210 is illustrated as the location where the crossing line 1208 intersects the boundary line 1202. In FIG. 13, a reference location 1314 is illustrated as the location where the crossing line 1310 intersects the boundary line 1302, and a reference location 1316 is illustrated as the location where the crossing line 1312 intersects the boundary line 1304.

Although reference locations are typically determined as a location at which a crossing line running approximately tangent to the tips of two adjacent fingers intersects the boundary line between those two adjacent figures, a reference location can alternatively be determined as the location at which any crossing line intersects any boundary line. For example, in FIG. 13 the location at which the crossing line 1312 intersects the boundary line 1302 can be determined to be a reference location, and the location at which the crossing line 1310 intersects the boundary line 1304 can be determined to be a reference location.

Minutiae areas of each finger are also determined (act 1108). A minutiae area of a finger refers to the portion of the fingerprint in which minutiae are to be identified. The minutiae area of different fingers can be determined in the same or alternatively different manners. In one embodiment, the minutiae area of a finger is determined to be an approximately circular portion of the fingerprint defined by an approximately circular geometric shape that is tangent to the edge and/or boundary lines bordering the finger and the crossing line that is approximately tangent to the tip of the finger. For example, in FIG. 12 a minutiae area 1212 is illustrated for the index finger, and a minutiae area 1214 is illustrated for the middle finger. By way of another example, in FIG. 13 a minutiae area 1318 is illustrated for the index finger, a minutiae area 1320 is illustrated for the middle finger, and a minutiae area 1322 is illustrated for the middle finger.

In other embodiments, the minutiae area of one or more of the fingers is determined in other manners. For example, in another embodiment the minutiae area of the finger is determined to be an approximately elliptical portion of the fingerprint defined by an approximately elliptical geometric shape that is tangent to the edge and/or boundary lines bordering the finger and the crossing line that is approximately tangent to the tip of the finger. In this embodiment, the minutiae areas are similar to those illustrated in FIGS. 12 and 13, but are approximately elliptical in shape rather than approximately circular.

In another embodiment, a joint line of the finger is identified, and the minutiae area of the finger is determined to be the portion of the fingerprint that is bounded by the edge and/or boundary lines bordering the finger, the crossing line that is approximately tangent to the tip of the finger, and the joint line of the finger. The joint line can be identified by analyzing the fingerprint data in a direction parallel to an edge or boundary line of the finger and below the crossing line of the finger. An area in the fingerprint data in that direction that is in the shape of an approximately straight line where no portions of the surface of the finger are sensed as protruding further than other portions is the joint line of the finger. These areas can be identified using any of a variety of different public and/or proprietary techniques, including pattern recognition techniques, data analysis techniques, and so forth.

Figure 14:
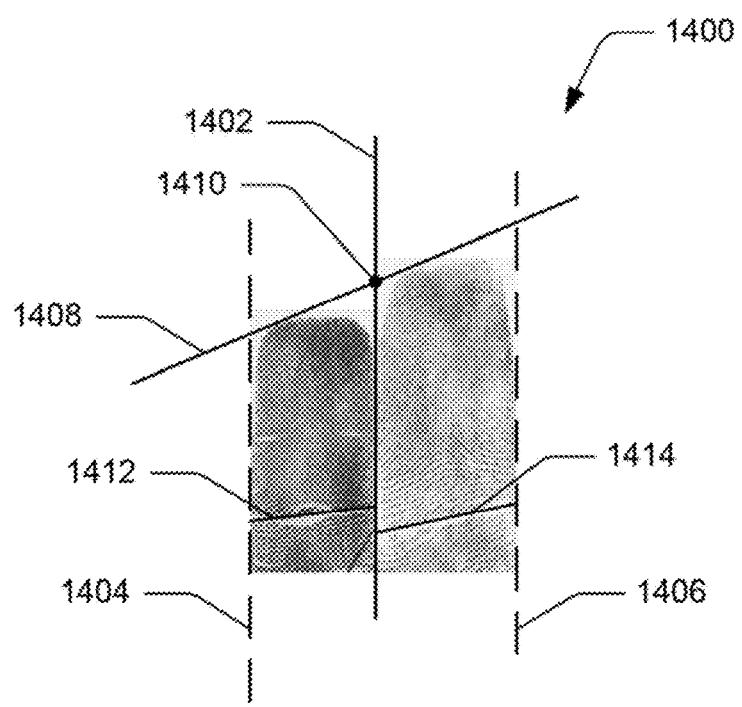
FIG. 14 illustrates another example of fingerprint data sensed for two fingers in accordance with one or more embodiments.

FIG. 14 illustrates example fingerprint data 1400 sensed for two fingers in accordance with one or more embodiments. The fingerprint data 1400 includes fingerprint data for two fingers, such as an index finger on the left and a middle finger on the right. As illustrated, the index finger and middle finger are situated adjacent to one another when the fingerprint data is sensed. A boundary line 1402 between the two fingers is determined, and edge lines 1404 and 1406 are also determined. A crossing line 1408 running approximately tangent to the tips of the index finger and middle finger is determined, and a reference location 1410 at the location where crossing line 1408 intersects boundary line 1402 is also determined A joint line 1412 identifying the joint in the index finger is determined, and a joint line 1414 identifying the joint in the middle finger is also determined.

In the example of FIG. 14, the minutiae area of the index finger is the portion of the fingerprint bounded by the edge line 1404, the crossing line 1408, the boundary line 1402, and the joint line 1412. The minutiae area of the middle finger is the portion of the fingerprint bounded by the edge line 1406, the crossing line 1408, the boundary line 1402, and the joint line 1414.

Returning to FIG. 11, minutiae in each of the determined minutiae areas are identified (act 1110). The minutiae can take various forms as discussed above, such as ridge endings, bifurcations, scar beginning points, scar termination points, and so forth. The minutiae can be identified using any of a variety of different public and/or proprietary techniques.

In one embodiment, the locations of minutiae in each determined minutiae area are identified relative to the locations of minutiae in one or more other determined minutiae areas (act 1112). For example, referring to FIG. 12 the locations of minutiae in the area 1212 relative to the locations of minutiae in the area 1214 can be identified, or the locations of minutiae in the area 1214 relative to the locations of minutiae in the area 1212 can be identified. By way of another example, referring to FIG. 13 the locations of minutiae in the area 1318 relative to the locations of minutiae in the area 1320 and/or the area 1322 can be identified, the locations of minutiae in the area 1320 relative to the locations of minutiae in the area 1318 and/or the area 1322 can be identified, and/or the locations of minutiae in the area 1322 relative to the locations of minutiae in the area 1318 and/or the area 1320 can be identified.

The locations of minutiae in one minutiae area being identified relative to the locations of minutiae in another minutiae area refers to the locations of the minutiae in the two minutiae areas being identified based on or with reference to a common reference point. This common reference point can be, for example, the reference locations where the crossing lines intersect the boundary lines (e.g., the reference location 1210 of FIG. 12, the reference locations 1314 and 1316 of FIG. 13, or the reference location 1410 of FIG. 14). Thus, the locations of minutiae can also be referred to as being identified relative to the locations of minutiae in another minutiae area based on the boundary lines and/or crossing lines.

The locations of minutiae in one minutiae area relative to the locations of minutiae in another minutiae area can be identified in a variety of different manners. In one embodiment, the locations of minutiae in one minutiae area relative to the locations of minutiae in one or more other minutiae areas are identified based on a two dimensional coordinate system. A reference location where a boundary line and a crossing line intersect is used as a reference point or origin of the coordinate system and the boundary line serves as one axis of the coordinate system (e.g., the y axis). The identified minutiae in the minutiae areas are analyzed by progressing along the boundary line and scanning the determined areas for identified minutiae on the other axis of the coordinate system (e.g., the x axis). The locations of the minutiae in one determined area relative to the locations of minutiae in another area are identified. The locations of minutiae in one minutiae area relative to the minutiae in another minutiae area can be specified in different manners, such as relative to the reference location (e.g., using the two dimensional coordinate system, an x,y coordinate of the location of each identified minutiae).

For example, referring to FIG. 12, the reference location 1210 can be the origin of the coordinate system and the minutiae identified in the areas 1212 and 1214 are analyzed by progressing from the reference location 1210 downward along the boundary line 1202. At each point along the boundary line 1202, the areas 1212 and 1214 are analyzed to determine whether identified minutiae is included in the areas 1212 and 1214 along the line normal to the boundary line 1202 at that point. The number of points along the boundary line 1202 is dependent on the resolution used to sense the fingerprint data. For example, if the fingerprint sensor senses the fingerprint data at a resolution of 360 dots per inch, then there would be 360 points along the boundary line 1202.

Returning to FIG. 11, in another embodiment the reference location where a boundary line and a crossing line intersect is used as a reference point or origin of the coordinate system and the crossing line serves as one axis of the coordinate system (e.g., the y axis). The identified minutiae in the minutiae areas are analyzed by progressing along the crossing line and scanning the determined areas for identified minutiae on the other axis of the coordinate system (e.g., the x axis). The locations of the minutiae in one determined area relative to the locations of minutiae in another area are identified.

In another embodiment, rather than identifying the locations of minutiae in each minutiae area relative to the locations of minutiae in one or more other minutiae areas in act 1112, the locations of minutiae in each determined minutiae area are identified relative to the locations of other minutiae in that same determined minutiae area (act 1114). For example, referring to FIG. 12 the locations of minutiae in the area 1212 relative to other minutiae in the area 1212 are identified, and the locations of minutiae in the area 1214 relative to other minutiae in the area 1214 are identified. By way of another example, referring to FIG. 13 the locations of minutiae in the area 1318 relative to other minutiae in the area 1318 are identified, the locations of minutiae in the area 1320 relative to other minutiae in the area 1320 are identified, and the locations of minutiae in the area 1322 relative to other minutiae in the area 1322 are identified.

The locations of minutiae in a minutiae area being identified relative to the locations of other minutiae in that same minutiae area refers to the locations of the minutiae in the minutiae area being identified based on or with reference to a common reference point. This common reference point can be, for example, a reference location as discussed above (e.g., the reference location 1210 of FIG. 12, the reference locations 1314 and 1316 of FIG. 13, or the reference location 1410 of FIG. 14), a location of the minutiae area (e.g., a center of an approximately circular minutiae area, an intersection of a joint line and a boundary line that bound the minutiae area), and so forth.

The locations of one or more of the determined minutiae areas are also identified relative to one another (act 1116). These locations of the determined minutiae areas can be identified in different manners, such as based on particular parts of the determined minutiae areas (e.g., the center of a circle that is the determined minutiae area, an intersection of a joint line and a boundary line that bound the minutiae area). Given the locations of one or more of the determined minutiae areas relative to one another as well as the locations of minutiae in each determined minutiae area relative to the locations of other minutiae in that same determined minutiae area, the locations of minutiae in the one or more of the determined minutiae areas relative to the locations of minutiae in the other can be readily identified.

By identifying the locations of minutiae in each determined area relative to the locations of minutiae in one or more other determined areas, for a given resolution of the fingerprint sensor the quantity of minutiae that can be used to authenticate the user is greater than the quantity of minutiae available if only a single fingerprint is used. Thus, for example, the techniques discussed herein allow a user authentication to be performed with approximately the same confidence as would be obtained by sensing the fingerprint of a single finger at a higher resolution because although the fingerprint sensor resolution may be lower the quantity of minutiae is at least approximately the same due to the multiple minutiae areas.

Returning to FIG. 5, the obtained finger characteristics can be used in various manners to attempt to authenticate the user in act 508. In situations in which act 1112 of FIG. 11 is performed, the finger characteristics are the locations of minutiae in each determined area relative to the locations of minutiae in one or more other determined areas. The attempt to authenticate the user is made by comparing these obtained finger characteristics to one or more stored finger characteristic samples maintained as part of the authentication data (e.g., the authentication data 114 of FIG. 1).

In situations in which acts 1114 and 1116 of FIG. 11 are performed, the finger characteristics can be the locations of minutiae in each determined area relative to the locations of other minutiae in that same area, as well as the locations of minutiae in each determined area relative to the locations of minutiae in one or more other determined areas. The attempt to authenticate the user is made by comparing one or more of these obtained finger characteristics to one or more stored finger characteristic samples maintained as part of authentication data (e.g., the authentication data 114 of FIG. 1). Different operations can use different ones of these finger characteristics.

For example, for one particular operation the finger characteristics to be used for authentication may be the locations of minutiae in each determined area identified relative to the locations of minutiae in one or more other determined areas. Thus, for this particular operation the user authentication is performed by comparing the identified locations of minutiae in each determined area relative to the locations of minutiae in one or more other determined areas to the stored locations of minutiae in each determined area relative to the locations of minutiae in one or more other determined areas.

By way of another example, for another particular operation the finger characteristics to be used for authentication may be a fingerprint of at least one finger. Thus, for this particular operation the user authentication is performed by comparing the identified locations of minutiae in each determined area relative to the identified locations of other minutiae in that same area to the stored locations of minutiae in each determined area relative to the locations of other minutiae in that same area. If the identified locations of minutiae in at least one determined area relative to the identified locations of other minutiae in that same area satisfy the authentication data (e.g., matches the stored locations of minutiae in that at least one determined area relative to the locations of other minutiae in that same area) then the attempt to authenticate the user is successful.

In attempting to authenticate the user in act 508, the lengths and/or widths of the user's fingers as determined based on the sensed fingerprint data can optionally be used to scale the finger characteristics. For example, the width of a user's fingers may be determined to be smaller if the pressure applied by the user touching the fingerprint sensor is less than if the pressure applied is greater. In other words, a user's finger may be sensed as being wider if he or she is pressing hard. The width of the user's fingers for purposes of authentication can be readily identified based on the authentication data for the user. If the width of the user's fingers as determined based on the sensed fingerprint data is not same as the width of the user's fingers determined based on the authentication data, then the sensed fingerprint data (and/or stored authentication data) can be scaled up or down as appropriate so that the width of the user's fingers as determined based on the sensed fingerprint data is the same as the width of the user's fingers determined based on the authentication data.

The finger characteristics can also be scaled in other manners. For example, in situations in which three or more fingers are sensed and thus there are multiple reference locations, the multiple reference locations can be used to scale the finger characteristics. If the distance between the multiple reference locations in the sensed fingerprint data are not the same as the distance between the multiple reference locations in the authentication data, then the sensed fingerprint data (and/or stored authentication data) can be scaled up or down as appropriate so that the distance between the multiple reference locations in the sensed fingerprint data is the same as the difference between the multiple reference locations in the authentication data.

It should also be noted that the attempt to authenticate the user in act 508 can be based on finger characteristics of different quantities of fingers. Different authentication data can be maintained (e.g., as the authentication data 114 of FIG. 1) for different finger combinations, such as authentication data for two fingers (e.g., an index finger and a middle finger, a middle finger and a ring finger, and/or a ring finger and a little finger), authentication data for three fingers (e.g., an index finger, middle finger, and a ring finger, or alternatively a middle finger, a ring finger, middle finger). Different operations can specify different quantities of fingers to be used for user authentication. For example, for one operation user authentication may require two adjacent fingers, and for another operation user authentication may require three fingers (each of which is adjacent to at least one other of the three fingers).

Similarly, the authentication data can be maintained for different particular fingers, and different operations can specify which finger combination is to be used for user authentication. For example, authentication data can be maintained for fingers on the user's left hand, for fingers on the user's right hand, for particular finger combinations (e.g., for an index finger and middle finger on the user's left hand, for a middle finger and a ring finger on the user's left hand), and so forth. Thus, whether a user is authenticated for a particular operation can be based on whether the proper fingers of the user are sensed by the fingerprint sensor.

Furthermore, it should be noted that by determining the user authentication based on multiple fingers, the user is less likely to be authenticated in the event of an unintended or inadvertent touching of the fingerprint sensor. For example, if the user inadvertently touches the fingerprint sensor with a single finger, the attempt to authenticate the user most likely be unsuccessful if the user authentication requires two or three fingers.

It should be noted that using the techniques discussed herein the multiple fingers can together be treated as a single large or "super" finger. These multiple fingers are each adjacent to at least one other finger when sensing the fingerprint data, resulting in the relative locations of minutiae being approximately the same each time the user's fingerprints are sensed by the fingerprint sensor (just as they are if the user authentication were based on a single fingerprint). For example, the fingerprint data 1200 of FIG. 12 is treated as a single finger having minutiae in two areas: the area 1212 and the area 1214. By way of another example, the fingerprint data 1300 of FIG. 13 is treated as a single finger having minutiae in three areas: the area 1318, the area 1320, and the area 1322.

Figure 15:
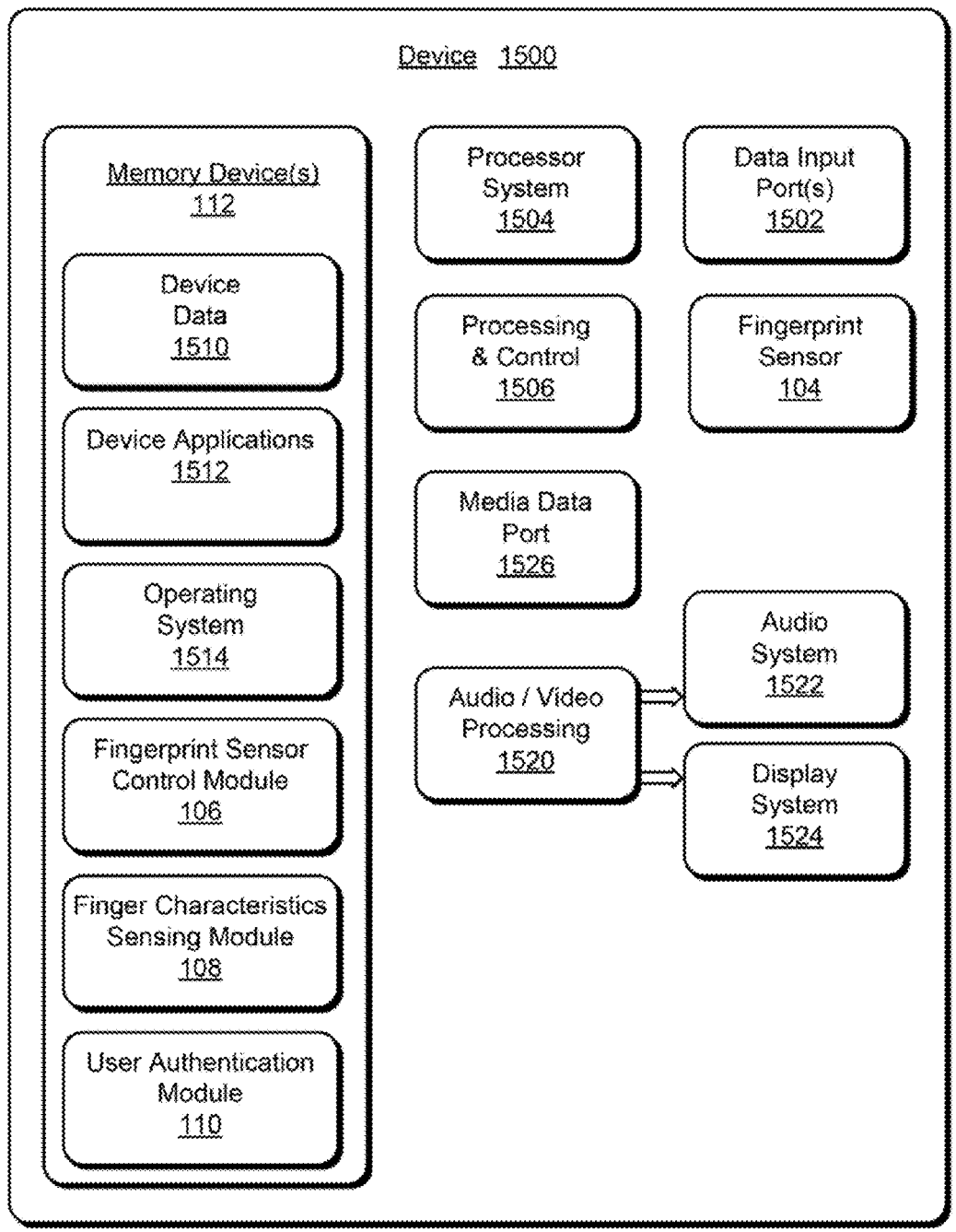
FIG. 15 illustrates various components of an example electronic device that can implement embodiments of the sensing characteristics of adjacent fingers for user authentication.

FIG. 15 illustrates various components of an example electronic device 1500 that can be implemented as a device as described with reference to any of the previous FIGS. 1-14. The device may be implemented as any one or combination of a fixed or mobile device, in any form of a consumer, computer, portable, user, wearable, communication, phone, navigation, gaming, messaging, Web browsing, paging, media playback, and/or other type of electronic device, such as the device 102 described with reference to FIG. 1, the device 202 described with reference to FIG. 2, the device 300 described with reference to FIG. 3, or the device 400 described with reference to FIG. 4.

The electronic device 1500 can include one or more data input ports 1502 via which any type of data, media content, and/or inputs can be received, such as user-selectable inputs, messages, music, television content, recorded video content, and any other type of audio, video, and/or image data received from any content and/or data source. The data input ports 1502 may include USB ports, coaxial cable ports, and other serial or parallel connectors (including internal connectors) for flash memory, DVDs, CDs, and the like. These data input ports may be used to couple the electronic device to components, peripherals, or accessories such as keyboards, microphones, or cameras.

The electronic device 1500 of this example includes a processor system 1504 (e.g., any of microprocessors, controllers, and the like), or a processor and memory system (e.g., implemented in an SoC), which process computer-executable instructions to control operation of the device. A processing system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the electronic device can be implemented with any one or combination of software, hardware, firmware, or fixed logic circuitry that is implemented in connection with processing and control circuits, which are generally identified at 1506. Although not shown, the electronic device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The electronic device 1500 also includes one or more memory devices 112 that enable data storage, examples of which include random access memory (RAM), non-volatile memory (e.g., read-only memory (ROM), flash memory, EPROM, EEPROM, etc.), and a disk storage device. A memory device 112 provides data storage mechanisms to store the device data 1510, other types of information and/or data, and various device applications 1512 (e.g., software applications). For example, an operating system 1514 can be maintained as software instructions with a memory device and executed by the processor system 1504.

In embodiments, the electronic device 1500 includes a fingerprint sensor control system 106, a finger characteristics sensing module 108, and a user authentication module 110 as described above. Although represented as a software implementation, each of the system 106, module 108, and module 110 may be implemented as any form of a control application, software application, signal-processing and control module, firmware that is installed on the device, a hardware implementation of the controller, and so on. The electronic device 1500 also includes a fingerprint sensor 104 as described above.

The electronic device 1500 can also include an audio and/or video processing system 1520 that processes audio data and/or passes through the audio and video data to an audio system 1522 and/or to a display system 1524. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1526. In implementations, the audio system and/or the display system are external components to the electronic device. Alternatively or in addition, the display system can be an integrated component of the example electronic device, such as part of an integrated touch interface.

Although embodiments of sensing characteristics of adjacent fingers for user authentication have been described in language specific to features and/or methods, the subject of the appended claims is not necessarily limited to the specific features or methods described. Rather, the specific features and methods are disclosed as example implementations of sensing characteristics of adjacent fingers for user authentication.

The invention claimed is:

1. A device comprising:
   a fingerprint sensor; and
   one or more modules configured to perform acts comprising:
   detecting multiple fingers of a user touching the fingerprint sensor, each of the multiple fingers being situated adjacent to one or more others of the multiple fingers while touching the fingerprint sensor;
   identifying a boundary line separating two fingers of the multiple fingers;
   obtaining data identifying locations of minutiae of a fingerprint of at least one of the two fingers relative to locations of minutiae of a fingerprint of the other of the two fingers based on the boundary line;
   determining, for each of the multiple fingers, a minutiae area based on the boundary line and a crossing line that runs approximately tangent to a tip of the finger;
   activating a high resolution mode of only a portion of the sensor, the portion of the sensor comprising the minutiae areas of the multiple fingers; and
   providing the obtained data to an authentication module to authenticate the user.

2. A device as recited in claim 1, the providing the obtained data to the authentication module comprising providing the obtained data to the authentication module to authenticate the fingerprints in the absence of reliance on centroids of the fingerprints of the two fingers.

3. A device as recited in claim 1, further comprising:
   obtaining additional data identifying a length or width of at least one of the two fingers relative to the other; and
   providing the obtained additional data to the authentication module.

4. A device as recited in claim 1, further comprising:
   identifying a crossing line that runs approximately tangent to tips of both of the two fingers, the crossing line intersecting the boundary line;
   determining a reference location as the intersection of the crossing line and the boundary line; and
   the data identifying the locations of minutiae of the fingerprint of the at least one of the two fingers relative to the reference location.

5. A device as recited in claim 1, the multiple fingers including three fingers, and the method further comprising:
   identifying an additional boundary line separating one of the two fingers and an additional finger of the three fingers;
   obtaining additional data identifying locations of minutiae of a fingerprint of at least one of the one finger and the additional finger relative to locations of minutiae of a fingerprint of the other of the one finger and the additional finger based on the additional boundary line; and
   providing the additional data to the authentication module to authenticate the fingerprints of at least the three fingers.

6. A device as recited in claim 1, further comprising:
   identifying how many boundary lines separate fingers of the multiple fingers;
   determining how many fingers are included in the multiple fingers based on how many boundary lines separate fingers of the multiple fingers; and
   providing an indication of how many fingers are included in the multiple fingers to a control module to determine a portion of the fingerprint sensor to activate in a high resolution mode.

7. A device as recited in claim 1, further comprising: identifying a shape of the multiple fingers;
   attempting to authenticate the shape of the multiple fingers;
   obtaining the data identifying locations of minutiae of the fingerprint m response to the shape of the multiple fingers being successfully authenticated; and
   failing authentication of the user in response to the shape of the multiple fingers being unsuccessfully authenticated.

8. A device comprising:
   a fingerprint sensor configured to sense two fingers and output an indication of locations of fingerprint minutiae of the two fingers, each of the two fingers being situated adjacent to one another while sensed by the fingerprint sensor; and
   a finger characteristics sensing module configured to receive the indication of locations of fingerprint minutiae of the two fingers and, based on the locations of fingerprint minutiae of the two fingers:
  identify a boundary line between the two fingers,
  generate data identifying the fingerprint minutiae of at least one of the two fingers relative to the fingerprint minutiae of the other of the two fingers based on the boundary line,
  determining, for each of the two fingers, a minutiae area based on the boundary line and a crossing line that runs approximately tangent to a tip of the finger,
  activating a high resolution mode of only a portion of the sensor, the portion of the sensor comprising the minutiae areas of the two fingers, and
  output the generated data.

9. A device as recited in claim 8, further comprising an authentication module, the finger characteristics sensing module being further configured to output the generated data to the authentication module, and the authentication module being configured to attempt to authenticate the fingerprints of the two fingers based on the data and without relying on a centroid of fingerprints of either of the two fingers.

10. A device as recited in claim 8, the fingerprint sensor comprising an adaptive fingerprint sensor configured to allow one portion of the fingerprint sensor to operate in the high resolution mode concurrently with another portion of the fingerprint sensor being allowed to operate in a low resolution mode, and further configured to operate the portion of the adaptive fingerprint sensor in which the two fingers are sensed in the high resolution mode while operating the remaining one or more portions of the adaptive fingerprint sensor in the low resolution mode.

11. A device as recited in claim 8, the fingerprint sensor comprising an indium tin oxide (ITO) touchscreen.

12. A device as recited in claim 8, the fingerprint sensor comprising a fingerprint sensor having a surface of a size smaller than fingerprints of the fingers, and being configured to sense fingerprint data identifying the locations of fingerprint minutiae of at least two fingers as the fingers are swiped across the surface of the fingerprint sensor.

13. A device as recited in claim 8, the fingerprint sensor comprising a fingerprint sensor configured to sense fingerprint data identifying the locations of fingerprint minutiae of at least two fingers concurrently.

14. A method comprising:
  obtaining data identifying locations of fingerprint minutiae of two fingers of a user, each of the two fingers having been situated adjacent to one another while the data was obtained, the data identifying the locations of fingerprint minutiae of at least one of the two fingers relative to the other of the two fingers and being based on a boundary line separating the two fingers;
  attempting to authenticate, without relying on a centroid of fingerprints of either of the two fingers, the user based on the fingerprint minutiae of the two fingers;
  the data further identifying locations of fingerprint minutiae of at least one of the two fingers and an additional finger relative to locations of fingerprint minutiae of the other of the at least one of the two fingers and the additional finger, the data being further based on an additional boundary line separating the at least one of the two fingers and the additional finger;
  identifying one crossing line that runs approximately tangent to tips of two of the two fingers and the additional finger situated adjacent to one another while the data was obtained, the one crossing line intersecting the boundary line;
  identifying an additional crossing line that runs approximately tangent to tips of a different two of the two fingers and the additional finger situated adjacent to one another while the data was obtained, the additional crossing line intersecting the additional boundary line;
  determining one reference location as the intersection of the one crossing line and the boundary line;
  determining an additional reference location as the intersection of the additional crossing line and the additional boundary line;
  the attempting including scaling the sensed locations of fingerprint minutiae based on the two determined reference locations; and
  outputting an indication of whether the user is authenticated.

15. A method as recited in claim 14, the data identifying the locations of fingerprint minutiae including data identifying sensed locations of fingerprint minutiae, and the attempting including scaling the sensed locations of fingerprint minutiae based on a width of at least one of the fingerprints.

16. A device comprising:
  a fingerprint sensor configured to sense two fingers and output fingerprint data indicating of locations of fingerprint minutiae of the two fingers, each of the two fingers being situated adjacent to one another while being sensed by the fingerprint sensor; and
  a finger characteristics sensing module configured to receive the fingerprint data and, based on the locations of fingerprint minutiae of the two fingers:
    identify a boundary line between the two fingers,
    generate data identifying the locations of the fingerprint minutiae in a minutiae area of a first finger of the two fingers relative to the locations of other fingerprint minutiae in the minutiae area of the first finger,
    generate data identifying the locations of the fingerprint minutiae in a minutiae area of a second finger of the two fingers relative to the locations of other fingerprint minutiae in the minutiae area of the second finger,
    generate data identifying the location of the minutiae area of the first finger relative to the minutiae area of the second finger,
    determining, for each of the two fingers, a minutiae area based on the boundary line and a crossing line that runs approximately tangent to a tip of the finger,
    activating a high resolution mode of only a portion of the sensor, the portion of the sensor comprising the minutiae areas of the two fingers, and
    output the generated data.

17. A device as recited in claim 16, finger characteristics sensing module being further configured to:
  determine, a crossing line that runs approximately tangent to tips of the two fingers and intersects the boundary line;
  determine, as the minutiae area of the first finger, an approximately circular area of the first finger that is tangent to the boundary line and the crossing line; and
  determine, as the minutiae area of the second finger, an approximately circular area of the second finger that is tangent to the boundary line and the crossing line.

* * * * *